Sept. 25, 1934.  A. R. THOMAS  1,974,728
REFRIGERATION
Filed July 10, 1933
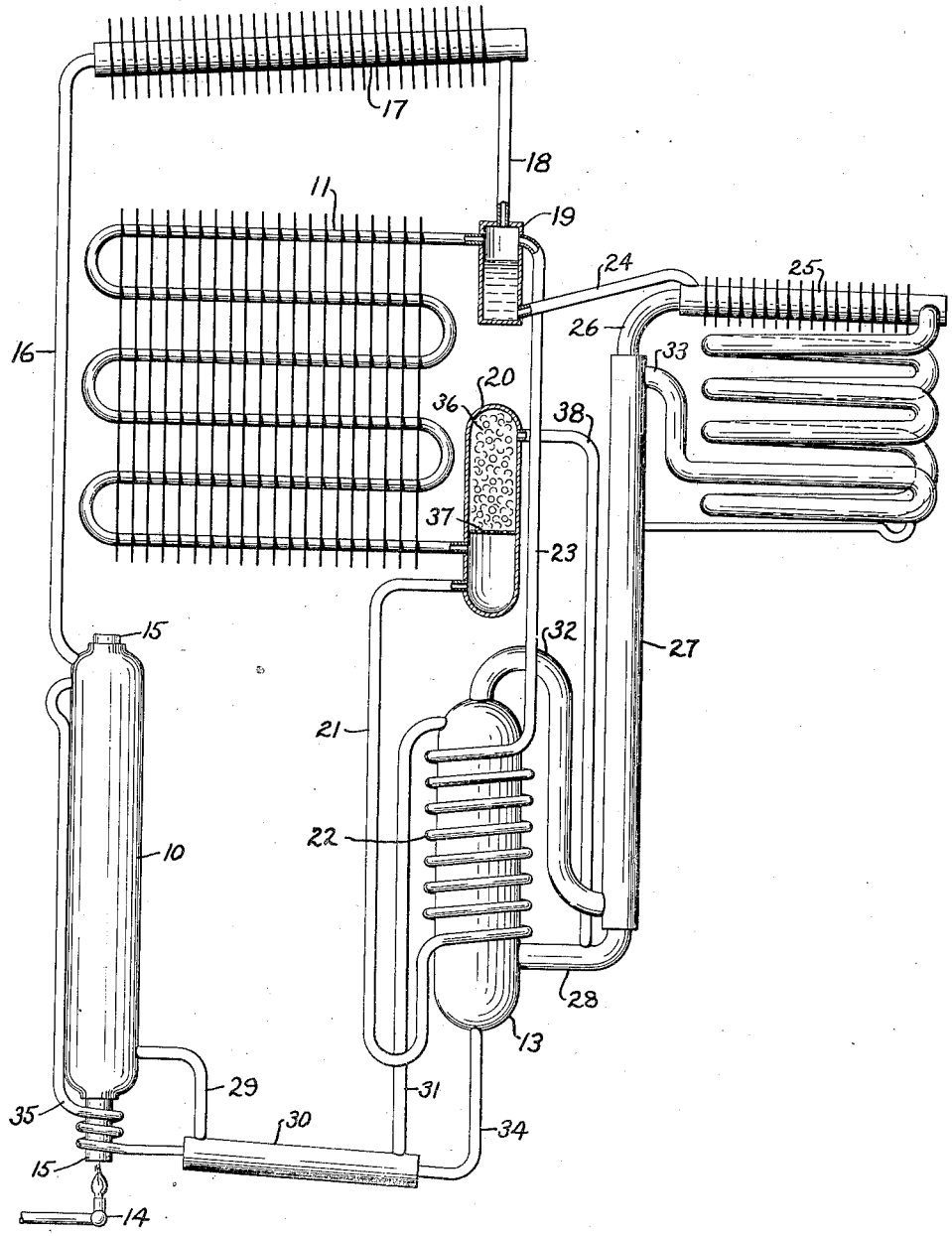

Patented Sept. 25, 1934

1,974,728

UNITED STATES PATENT OFFICE 1,974,728

REFRIGERATION

Albert R. Thomas, New York, N. Y., assignor to Electrolux Servel Corporation, New York, N. Y., a corporation of Delaware Application July 10, 1933, Serial No. 679,610

12 Claims. (Cl. 62—119.5)

My invention relates to the art of refrigeration and particularly to refrigeration systems of the absorption type in which refrigeration is produced by evaporation of refrigerant by diffusion into an auxiliary gas used to maintain equal pressures throughout the system and still more particularly to a refrigeration system of this type cooled by air.

In a pressure equalized absorption refrigeration system, refrigerant vapor is expelled from solution in a generator, condensed to liquid in a condenser, the liquid evaporated by diffusion into an inert gas in an evaporator, and the refrigerant vapor absorbed into solution out of the resulting gas mixture in an absorber. Such a system is charged with inert gas at such a pressure that condensation of vapor will occur in the condenser at the temperature thereof maintained by the cooling medium. When air is used as the cooling medium there is presented a problem due to the wide variation in temperature of the air. If the system is charged with gas at a pressure sufficient for condensation at normal temperatures, complete condensation will not occur at higher temperatures. On the other hand, if inert gas is charged at a pressure sufficient for condensation at the maximum temperature that may occur, the system will operate at greatly reduced efficiency at normal temperature. It has therefore been proposed to automatically vary the total pressure in the system responsive to variation in temperature of the cooling medium. This has been accomplished by providing a storage receptacle for auxiliary gas from which the latter is displaced into the gas circuit of the refrigeration system upon increase in temperature of the cooling medium. For a more detailed description of such an arrangement reference may be had to Patent No. 1,822,224 to Donald B. Knight. The storage vessel for auxiliary gas, which is generally referred to as a pressure vessel, must be sufficiently large to contain the requisite amount of gas for raising the pressure in the system to maximum at maximum condenser temperature.

In accordance with my invention I provide for storage of auxiliary gas in a pressure vessel of reduced size without reduction in the amount of gas stored. In other words I increase the storage capacity of a vessel of given size. This I accomplish by using a small size vessel containing an absorbent or adsorbent for the auxiliary gas. My invention will be more fully understood by reference to the following description taken in connection with the accompanying drawing, in which, The figure shows schematically an absorption refrigeration system embodying my invention.

Referring to the drawing, the refrigeration system illustrated is the same as that fully set forth in my earlier application Serial No. 613,387 to which reference may be had for a complete description. Briefly, however, this system comprises a generator 10, a condenser 11, an evaporator 25, and an absorber 13 interconnected for circulation of a refrigerant fluid. The system may be charged with any suitable solution of a refrigerant in an absorbent, such as a water solution of ammonia, and an auxiliary gas such as hydrogen. The generator 10 is suitably heated as by a gas burner 14 directed into the lower end of a flue 15, which latter extends vertically through the generator.

Vapor expelled from solution in the generator by heat flows through conduit 16, rectifier 17, conduit 18, and the upper part of a gas and liquid separating vessel 19 into the upper end of the condenser 11. The latter is provided with heat radiation fins for cooling with air. Ammonia vapor is liquefied in the condenser and the liquid drains from the lower end thereof into the lower part of a pressure vessel 20. This vessel is constructed in accordance with my invention and will be hereinafter more fully described. From the pressure vessel 20, liquid ammonia drains through conduit 21 into a cooling coil 22 arranged in thermal transfer relation with the absorber 13. From the upper end of the absorber cooling coil, a conduit 23 is connected to the upper part of the separating vessel 19. The coil 22 and conduit 23 are preferably of such small internal diameter that gas and liquid cannot pass each other therein. The absorber 13 is cooled by transfer of heat to the liquid ammonia in the cooling coil 22, thus supplying heat of vaporization of some of the liquid. The vapor rising through the coil 22 and conduit 23 raises liquid ammonia into the separating vessel 19 in a manner well known in the art.

From the separating vessel 19, the vapor returns to the condenser 11 while the liquid ammonia overflows through conduit 24 into the upper part of the evaporator 25 where it flows downwardly, evaporating by diffusion into the auxiliary gas, hydrogen, producing a refrigerating effect. The resulting gas mixture flows from the evaporator 25 through conduit 26, gas heat exchanger 27, and conduit 28 into the absorber 13. Weak solution overflows from the generator 10 through conduit 29, liquid heat exchanger 30, and conduit 31 into the absorber 13 where it absorbs ammonia out of the gas mixture. The weak gas returns through conduit 32, gas heat exchanger 27, and conduit 33 to the evaporator, thus completing the auxiliary gas circuit between the evaporator and absorber. Enriched absorption solution accumulates in the lower part of the absorber 13 from where it flows through conduit 34, liquid heat exchanger 30, and is raised by a thermosiphon 35 back into the generator in the manner well known in the art, thus completing the circuit for the solution between the generator and absorber.

The upper part of the pressure vessel 20 is connected through a conduit 38 to the conduit 28, thus placing the upper part of the pressure vessel in communication with the gas circuit between the evaporator and absorber. Assuming that the system has been charged with hydrogen at such a pressure that the ammonia liquefies in the condenser 11 at normal air temperature, the pressure vessel 20 will contain, under normal operating conditions, an auxiliary supply of hydrogen. In accordance with my invention I provide in the pressure vessel a substance 36 which is either an adsorbent or absorbent for the hydrogen, thereby storing in the pressure vessel a greater amount of hydrogen than would be contained therein without the presence of such a substance. I may use any of a number of substances such as palladium, charcoal, silica gel, pumice, or the like, which may be positioned in the upper part of the pressure vessel by a perforated disc or screen 37 leaving a sump or well in the lower part of the vessel into which liquid ammonia drains from the condenser and flows therefrom through conduit 21 to the absorber cooling coil 22. It will be understood that either an absorbent or adsorbent may be used and for the purposes of this application, including the claims, the term absorption includes adsorption. The upper part of the pressure vessel and conduit 38 form a vent from the condenser to the gas circuit for release of hydrogen which may have been carried into the condenser by the absorption and distillation process.

As the temperature of the cooling air rises above normal, uncondensed hot ammonia vapor flows from the lower end of the condenser into the pressure vessel 20, heating the palladium or other absorbent and reducing the partial pressure of the hydrogen. Consequently, hydrogen evaporates and is displaced into the gas circuit through conduit 38. As hydrogen is expelled into the gas circuit, the pressure increases to a value at which complete condensation occurs in the condenser. When the temperature of the condenser decreases, the partial pressure of hydrogen in the pressure vessel increases and hydrogen is again absorbed, decreasing the total pressure in the system to correspond with the decrease in condenser temperature.

I prefer palladium as the absorbent on account of its comparatively great absortion of hydrogen. Incidentally, the absorption of ammonia by palladium is negligible, but some of the other substances that may be used, such as charcoal, will also absorb the ammonia. This is a distinct advantage since it is desirable to have a weaker solution in the generator when the condenser temperature is high and this will occur if the substance in the pressure vessel absorbs ammonia during the high temperature periods, thus removing it from circulation in the system. Upon lowering of the condenser temperature, the ammonia evaporates when the hydrogen flows into the vessel due to the change in partial pressures.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. That improvement in the art of refrigeration with a system containing a refrigerant fluid and an additional fluid for equalizing pressure which comprises, storing an excess of said additional fluid under normal operating conditions in an absorbent and circulating the stored additional fluid in the system responsive to increase in partial pressure of said refrigerant fluid adjacent said absorbent.

2. That improvement in the art of refrigeration with a system containing a refrigerant fluid and an additional fluid for equalizing pressure and cooled by air which comprises, storing an excess of said additional fluid in an absorbent during normal operating conditions, and displacing the stored additional fluid with refrigerant fluid and circulating the displaced additional fluid in the system upon an increase in temperature of the cooling air.

3. That improvement in the art of refrigeration with a system containing a refrigerant fluid and an additional fluid for equalizing pressure which comprises, storing an excess of said additional fluid in an absorbent during normal operating conditions, displacing said excess of additional fluid with refrigerant fluid when the pressure in the system increases, storing the displacing refrigerant fluid in the absorbent, and circulating displaced excess additional fluid in the system.

4. That improvement in the art of refrigeration with an absorption system which comprises, circulating a refrigerant through a main cycle, circulating a pressure equalizing gas through an auxiliary cycle coinciding in part with said main cycle, liquefying refrigerant at a point in said main cycle under normal conditions, allowing a portion of said refrigerant to pass said point in the main cycle without being liquefied under abnormal conditions, storing excess pressure equalizing gas in an absorbent adjacent said auxiliary cycle, and utilizing uncondensed refrigerant to displace the stored pressure equalizing gas from the absorbent into said auxiliary cycle under abnormal conditions.

5. That improvement in the art of refrigeration with a system containing a refrigerant fluid and an additional fluid for equalizing pressure and utilizing a medium outside of the system to effect liquefaction of said refrigerant fluid which comprises, storing an excess of said additional fluid in an absorbent during normal operating conditions, and displacing the stored additional fluid with refrigerant fluid and circulating the displaced additional fluid in the system upon an increase in temperature of said cooling medium.

6. In a refrigeration system containing a refrigerant fluid and an additional fluid for equalizing pressure, means connected to receive uncondensed refrigerant fluid and including an absorbent for storing an excess of said additional fluid under normal operating conditions.

7. In an absorption refrigeration system having a main circuit for refrigerant fluid and an auxiliary circuit for pressure equalizing gas coinciding in part with said main circuit, means for storing excess pressure equalizing gas during normal operating conditions comprising a vessel communicating with both said auxiliary circuit and said main circuit and containing an absorbent for said gas.

8. An absorption refrigeration system comprising, a main circuit for refrigerant fluid including a condenser, an auxiliary circuit for pressure equalizing gas coinciding in part with said main circuit, a storage vessel containing an absorbent for said gas connected to said auxiliary circuit, and a gas vent from said condenser to said storage vessel.

9. An absorption refrigeration system comprising, a main circuit for refrigerant fluid including a condenser, an auxiliary circuit for hydrogen coinciding in part with said main circuit, a vessel containing palladium in communication with said hydrogen circuit, and a gas vent from said condenser to said vessel.

10. A refrigeration system comprising, a generator, a condenser, an evaporator, and an absorber interconnected for circulation of a refrigerant fluid, said evaporator and absorber being interconnected to form an auxiliary circuit for pressure equalizing gas, a gas vent from said condenser to said gas circuit, and an absorbent for the pressure equalizing gas in said vent.

11. A refrigeration system comprising, a circuit for refrigerant fluid including a generator, a condenser, an evaporator, and an absorber, said evaporator and absorber being interconnected to form an auxiliary circuit for hydrogen, and a gas vent from said condenser to said hydrogen circuit containing palladium.

12. A refrigeration system comprising, a circuit for refrigerant fluid including a generator, a condenser, an evaporator, and an absorber, said absorber and evaporator being interconnected to form an auxiliary circuit for a pressure equalizing fluid, and a gas vent from said condenser to said auxiliary circuit containing an absorbent for said fluids.

ALBERT R. THOMAS.